Feb. 2, 1971     H. DROLL     3,559,268
DRAWING-IN TOOL FOR THE DRAWING OF COILS INTO STATOR GROOVES
Filed Oct. 24, 1969
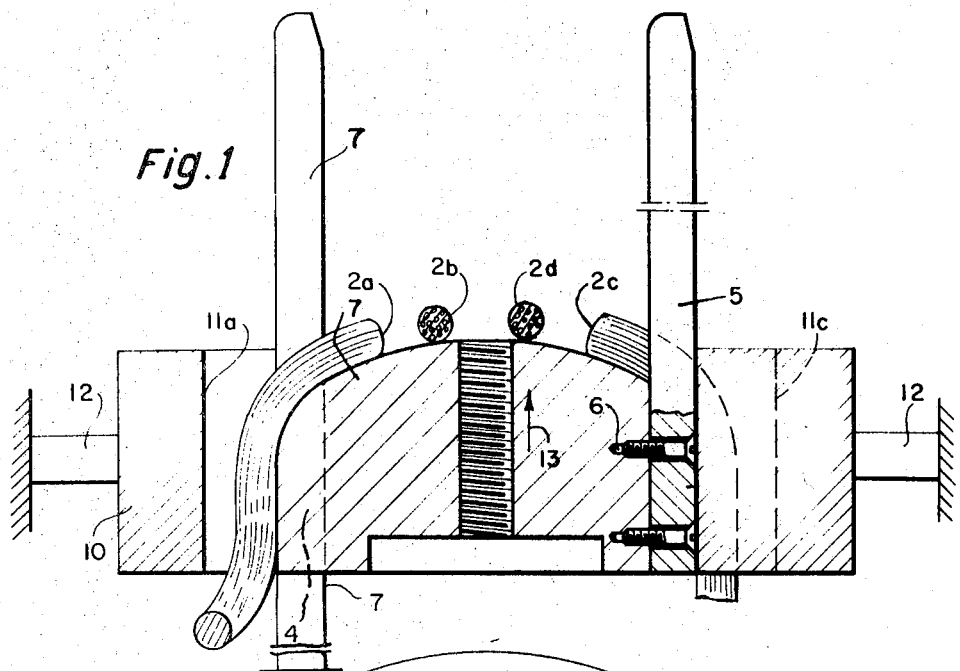
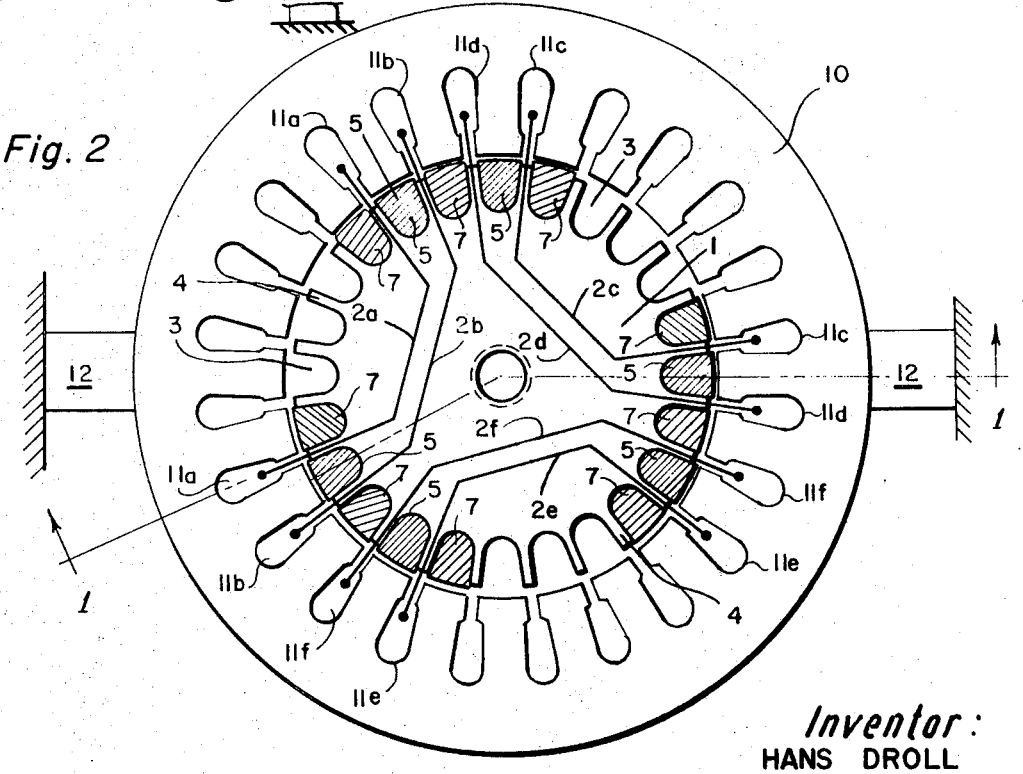
Inventor:
HANS DROLL
ATTORNEYS Patented Feb. 2, 1971

3,559,268
DRAWING-IN TOOL FOR THE DRAWING OF
COILS INTO STATOR GROOVES
Hans Droll, 6 Bergen-Enkheim, Nordring 75, Germany
Filed Oct. 24, 1969, Ser. No. 869,286
Claims priority, application Germany, Apr. 11, 1969,
P 19 18 485.1
Int. Cl. H02k 15/00
U.S. Cl. 29—205      4 Claims

ABSTRACT OF THE DISCLOSURE

A device for placing pre-wound coils into stator grooves including a generally circular stripper member movable through the stator. Teeth are arranged about the periphery of the stripper member with fingers in slots between the teeth. Some fingers, and preferably at least one finger adjacent each tooth which contains a pre-wound coil to be placed into the stator is fixed onto the stripper member for movement therewith as the latter moves through the stator.

BACKGROUND OF THE INVENTION

This invention relates to the production of stators for electrical machines and the like, and in particular it relates to a new and improved device for placing pre-wound coils into stator grooves.

A known apparatus for inserting pre-wound coils into stator grooves includes a star-shaped stripper member having slots formed in its outer periphery between radially extending teeth, the said stripper member being movable parallel to its axis and slidable relative to elongated fingers located in said slots. Pre-wound coils are initially placed onto these fingers as the latter extend through the center of a stator. The stripper member is then moved through the center of the stator, sliding along the fingers, to remove the coils from the fingers and insert the same into the stator grooves.

An apparatus of this general type is illustrated in the Hill Patent No. 3,324,536, issued June 13, 1967.

However, the previously known apparatus suffers from the disadvantage that the wires of the pre-wound coils become pinched as they are moved from the surface of the stripper member into the stator grooves. This pinching occurs whenever the diameter of the pre-wound coil is too large relative to the width of the groove opening of the stator or relative to the distance between the two adjacent fingers which support a given pre-wound coil for guiding the same into a stator groove upon movement of the stripper member. Attempts have been made to solve this pinching problem by enlarging the distance or otherwise favorably redesigning the space between the fingers. However, this solution has not eliminated the pinching of the wires by a sufficient amount. As a result of this problem, in practice apparatus of the present type including a stripper member and elongated fingers cannot be used for inserting into stators pre-wound coils above a predetermined thickness.

SUMMARY OF THE INVENTION

It is a purpose of the present invention to provide a new and improved device of the type including a stripper member and a plurality of fingers for inserting pre-wound coils into stator grooves, which device overcomes disadvantages in the prior art.

This purpose of the present invention is achieved by providing a device wherein friction between the wires of the pre-wound coil and the fingers of the device is reduced during insertion of the coils. To achieve this result, in accordance with the present invention at least one of the two fingers adjacent each coil at the periphery of the stripper member is fixed to the stripper member for movement therewith. Since these fixed fingers will move with the stripper member, there will be no relative movement of the same with respect to the pre-wound coils carried along by the stripper member as the coils are inserted into the stator grooves. Thus, there will be no friction between these fingers and the coils tending to push the wires of the coil one over the other thereby pinching them. Although advantageous results are achieved by affixing to the stripper member only one of the two fingers adjacent a given coil at the edge of the stripper member, even better results can be obtained by affixing to the stripper member for movement therewith both of the fingers adjacent a given coil.

Thus, it is an object of this invention to provide a new and improved device for inserting pre-wound coils into stator grooves.

It is another object of this invention to provide a new and improved device for inserting oils into stator grooves wherein at least one of the two fingers supporting a given coil are fixed to the stripper member for movement therewith.

Another object of this invention is to provide a new and improved device for inserting pre-wound coils into stator grooves wherein pinching the coils during the insertion stage is substantially reduced.

Other objects and the intended advantages of the present invention will become apparent from the detailed description to follow, together with the accompanying drawings.

BRIEF DESCRIPTION OF THE DRAWINGS

There follows a detailed description of a preferred embodiment of the invention to be read together with the accompanying drawings. It is to be understood, however, that the description and the drawings are provided only to illustrate a preferred embodiment of the invention.

FIG. 1 is a sectional view taken along line 1—1 of FIG. 2 in showing a device of the present invention in use with respect to a stator.

FIG. 2 is a plan view of the device shown in FIG. 1.

DETAILED DESCRIPTION OF THE PREFERRED EMBODIMENT

Referring now to the drawings, like elements are represented by like numerals throughout the two views.

The device includes a "star-shaped" stripper number 1 having a plurality of teeth 4 extending radially outwardly therefrom with slots 3 between the teeth. Also shown in the figures is a stator 10 having a plurality of grooves 11 therein, each groove being located directly across from the outer periphery of a tooth 4. Also shown in the figures are 6 separate pre-wound coils 2a through 2f. The outer portions of each of these coils are to be inserted into grooves 11 having subscripts corresponding to the subscript of the coil. For example, coil 2a is to be inserted into slots 11a, coil 2b into the two slots 11b, etc. A holding means 12, illustrated symbolically in the figures, is provided for stationarily supporting the stator during the coil insertion operation.

The device includes a plurality of mounting fingers located within the slots 3 of the stripping member 1. In accordance with a main feature of the present invention, and for a purpose to be described in greater detail below, some of these mounting fingers 5 are rigidly secured to the stripping member 1 by any suitable means such as screws 6. However, the purpose of the invention is achieved even if all of the mounting fingers are not fixed to the stripping member as is finger 5. Thus, the device may also include a plurality of previously known mounting fingers 7 which are fixed with respect to a base and slidable within its slot 3 as the stripping member moves upwardly through the stator in the direction of the arrow 13, (in FIG. 1).

The device of the present invention operates as follows. First, before the stator 11 is brought into the vicinity of the device the pre-wound coils are located on the stripper member 1 so that the outer portions of the coils each lie on a tooth 4 between intervals 3, each of which contain a mounting finger 5 or 7. In the present case, six separate coils 2a, 2b, 2c, 2d, 2e and 2f are shown. See in particular FIG. 2. Although it would be most desirable to use only mounting fingers 5, fixed to the stripper member 1, it has been found economically advantageous and technically satisfactory if only one of the two mounting fingers adjacent each tooth 4 containing a coil thereon is a fixed finger 5. This is the case illustrated in FIG. 2. Six fixed mounting fingers 5 are shown and the remainder of the mounting fingers are of the sliding type 7 which are fixed to the base of the apparatus rather than to the stripper member 1.

With the coils in place on the mounting fingers of the stripper member, the stator 11 is placed above the stripper member with its grooves lying each across from one tooth 4 of the stripper member. In the present case the grooves 11a lie across from the teeth 4 containing the outer portions of coil 2a, the groove 11b are radially aligned with the teeth 4 containing the outer portions of coil 2b, et cetera. The stripper member 13 is then moved upwardly through the stator as the outer portion of the teeth 4 and the rounded upper portion of the stripper member 1 force the pre-wound coils into their respective grooves. The figures illustrate this operation just as the stripper member 1 is passing through the stator. This figure clearly illustrates one end of coil 2a being forced into its respective groove 11a.

With prior art devices for carrying out the coil insertion operation, during the insertion procedure the wires of a coil would frictionally engage its two adjacent mounting fingers. If the coil was large realtive to the size of the space between its two adjacent mounting fingers, the individual wires of the coil were jammed against each other as a result of this frictional engagement thereby pinching the coil.

In the present case, the friction between the wires in the coils 2 and the mounting fingers are either considerably lowered or avoided altogether because at least one of the two adjacent mounting fingers is attached to the stripper member for movement therewith. Thus, since there is no sliding of this mounting finger relative to the coil, there is no detrimental frictional engagement between the fixed mounting finger and its coil which would tend to pinch the wires of the said coil.

Although the invention has been described in detail with respect to a preferred embodiment thereof, it will be apparent that the invention is capable of numerous modifications and variations apparent to those skilled in the art.

I claim:

1. A device for placing pre-wound coils into grooves of stators or the like comprising: a stripper member mounted for movement through a stator, said stripper member including projections positioned about the periphery of the stripper member and extending outwardly therefrom such that in operation each said projection is positioned across from a stator groove; finger members located in planes passing between said projections and extending in a direction parallel to the direction of relative movement between the stripper member and the stator; one finger being located on each side of each projection which has a pre-wound coil associated with it for placement to a stator groove; at least one of said fingers on one side of a given projection which has a pre-wound coil associated with it being fixed to the stripper member for movement therewith through the stator to reduce relative frictional movement between the pre-wound coil associated with the said given projection and its adjacent fingers.

2. A device according to claim 1, wherein a finger on at least one side of each projection having a pre-wound coil associated with it is fixed to the stripper member for movement therewith.

3. A device according to claim 2, wherein the end of said stripper member facing the direction of movement through the stator is rounded.

4. A device according to claim 1, including slots formed on the periphery of said stripper member between said projections and extending through the stripper member in said direction parallel to the direction of movement of the stripper member relative to the stator, and wherein a portion of the cross-section of each finger is located in said slots, the fixed fingers being attached to the slots and the remainder of the fingers being slidable in the slots in said direction parallel to the direction of movement of the stripper member through the stator.

References Cited

UNITED STATES PATENTS

| 3,137,931 | 6/1964 | Moore | 29—205 |
| 3,324,536 | 6/1967 | Hill | 29—205 |
| 3,447,225 | 6/1969 | Eminger | 29—205 |

THOMAS H. EAGER, Primary Examiner

U.S. Cl. X.R.

29—205